INVENTORS
John J. Werth &
BY Orvil E. A. Bolduan

Hugh L. Fisher
ATTORNEY

United States Patent Office 3,319,071
Patented May 9, 1967

3,319,071
INFRARED GAS ANALYSIS ABSORPTION CHAMBER HAVING A HIGHLY REFLECTIVE SPECULAR INTERNAL SURFACE
John J. Werth, Santa Barbara, Calif., and Orvil E. A. Bolduan, Frankfurt am Main, Germany, assignors to General Motors Corporation, Detroit, Mich., a corporation of Delaware
Filed Nov. 27, 1964, Ser. No. 420,242
10 Claims. (Cl. 250—43.5)

This invention relates to apparatus for detecting substances by absorption of radiation and more particularly to portable apparatus for detecting the presence of small quantities of gas by means of infrared radiation absorption A fast and sensitive instrument for detecting small concentration of gases is the infrared spectrophotometer which measures attenuation of infrared radiation across a fixed path through a gas containing atmosphere. Sensitivity and speed of response are a function of the infrared source strength, effective absorption path length, and either system unbalanced fluctuation or detector noise equivalent power, whichever predominates. In a portable point alarm system based on the spectrophotometric principle, infrared source power and absorbing volume size are limited. Furthermore, since detectors that require cooling are not usually practical, detectivity is limited also. Finally, precise balancing of the system to insure zero signal in the absence of gas is much more difficult in a portable instrument than in a piece of laboratory equipment. These factors make it desirable to provide as long a path length as possible through the limited volume available in the instrument.

One method of extending the path length is to direct the infrared beam at a system of mirrors or lenses to reflect the radiation back and forth before allowing it to reach the detector. The more reflections, the longer the path lengths, but also the more critical the optical alignment of the components. When path lengths of 20 to 40 times the linear dimensions of the absorbing chamber are needed, the alignment requirement exceeds the practical limit for a portable instrument which will withstand rough handling.

The disadvantages of the prior art are obviated by the present invention in which a gas detector is provided which is particularly adaptable for portable use. The gas detector of the present invention does not require accurately aligned optics, is of light weight, and may utilize a large area source which operates at a lower temperature range thus consuming lower power.

More particularly, the gas detector of the present invention comprises an absorbing enclosure in the form of a distorted sphere having a highly reflective specular internal surface. Four openings are provided in the enclosure, one for the infrared source, one for the detector, and one each for introducing and exhausting the air to be sampled. The geometry of the sphere is distorted by forming a number of dimples in the surface of the sphere in a random fashion. By making the internal walls specular and highly reflective but at the same time distorting the geometry of the sphere, a random three-dimensional scattering of the light rays entering the sphere is obtained without excessive reflection losses. As a result the effective path length of light rays may be increased to many times the radius of the sphere and a highly sensitive portable gas detector is obtained.

A more complete understanding of the present invention may be had from the following detailed description which should be read in conjunction with the drawings in which.

Figure 1:
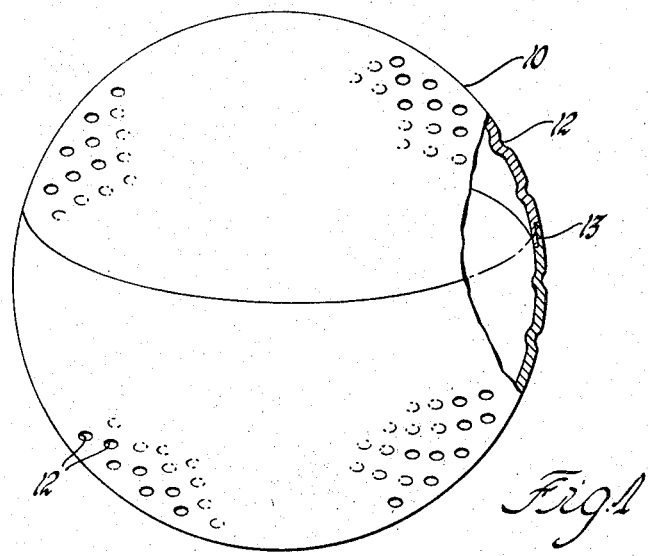
FIGURE 1 is a side elevational view of a preferred embodiment of the absorbing enclosure utilized in the present invention with parts broken away.

Referring now to the drawings and initially to FIGURE 1, there is shown an absorption chamber or enclosure 10 constructed in accordance with a preferred embodiment of the present invention. The enclosure 10 has a plurality of dimples 12 formed therein which distort the generally sperical geometry thereof. The hemispheres of the enclosure 10 are fabricated separately and are adapted to be joined at the juncture 13. The internal surface of each hemisphere of the enclosure is provided with a subcoating of a silicon resin and a coating of a highly reflected material such as gold.

Figure 2:
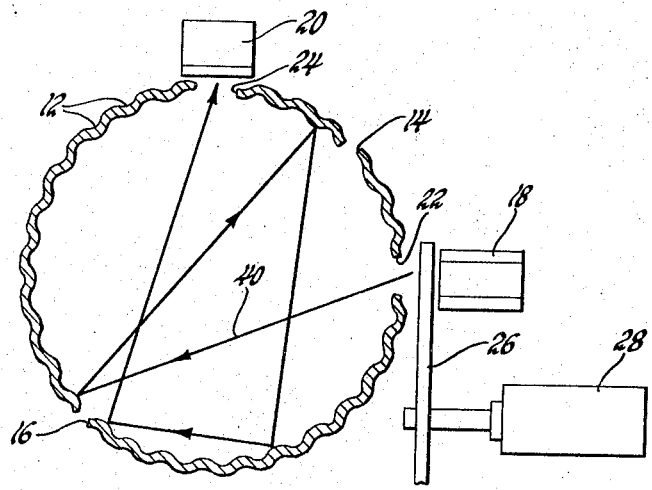
FIGURE 2 is a schematic representation of the absorbing chamber.

Referring now to FIGURE 2, the enclosure 10 is provided with openings 14 and 16 for introducing and exhausting a sample of the surrounding atmosphere. An infrared source 18 and a detector 20 are positioned to respectively radiate and receive energy through openings 22 and 24 in the enclosure 10. A chopper disc 26 supporting at least one analytic filter and one reference filter (not shown) is positioned between the source 18 and the opening 22 and is driven by a hysteresis synchronous motor 28. The analytic filter of the chopper disc 26 passes only radiation of a wave length which is readily absorbed by the gas to be detected and the reference filter of the chopper 26 passes eneregy of a wave length where little or no absorption takes places. Consequently, the analytic and reference filters of the chopper 26 provide a modulated light signal which is received by the detector 18 where it is converted to an alternating current signal. The alternating current signal from the detector represents the change in radiation incident on the detector when the analytic filter replaces the reference filter at a given gas concentration.

Figure 3:
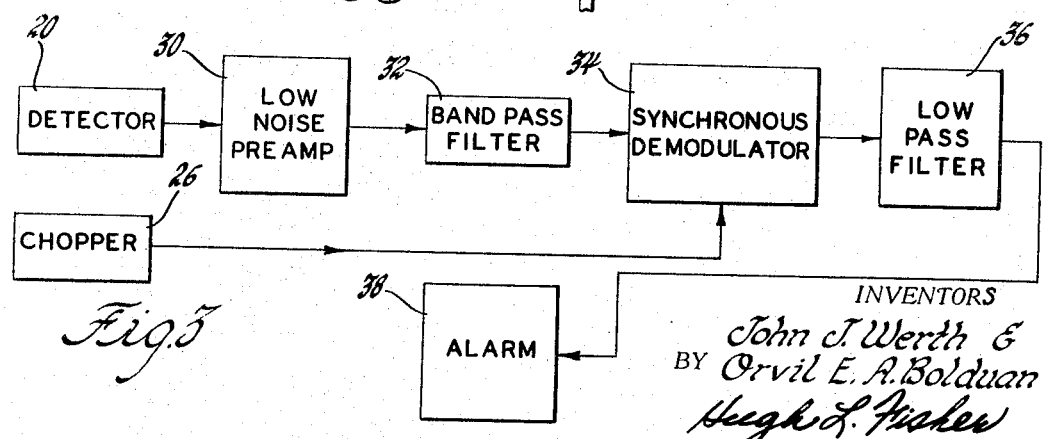
FIGURE 3 is a block diagram of the gas detecting apparatus of the present invention.

As shown in FIGURE 3, the output signal from the detector 20 is fed to a low noise preamplifier 30. The amplified signal from the preamplifier 30 is supplied to a band pass filter 32 which functions to pass the alternating current signal and side bands produced by the modulation of the radiation through the rotation of the chopper disc 26. The band pass filter 32 is designed to have a center frequency substantially corresponding to the frequency of the generated alternating current signal and a band with encompassing the side band surrounding the center frequency. The output signal from the band pass filter 32 is fed to a synchronous demodulator 34 and a low pass filter 36 where the signal is converted to a direct current signal for operating the alarm 38. The synchronous demodulator 34 is also fed by a reference signal from the chopper 26 to compensate for drifts in the speed thereof.

As indicated previously, one of the primary advantages of the present invention is the long path length of radiation which is obtained through random reflections of the energy from the specular internal reflecting surface of the chamber 10. For purposes of illustration, a representative light ray 40 is shown as emanating from the source 18 and reflecting a number of times from the internal surface of the enclosure 10 before being received by the detector 20. The dimples 12 which distort the geometry of the enclosure 10 may be placed therein by a small forming punch and die arrangement and the size and number of the dimples 12 are not highly critical. For optimum results, the dimples 12 should not be so large as to cause excessive deviation from the approximately spherical geometry and not so small as to make the sphere approach a diffuse rather than a specular reflector. A specular reflector may be defined as one which reflects energy at an angle which is equal to the angle of incidence.

By way of example, the enclosure of the present invention had an internal diameter of 6 inches and included 52 dimples per hemisphere. The tool for forming the dimples in this sphere was .125 inch in radius and the dimples extended approximately .125 inch into the sphere. The absorbing enclosure so constructed had an effective path length of about 70 times the radius of the sphere.

It will be apparent from FIGURE 2 that the energy radiated by the source 18 will be partially absorbed at the internal surface of the enclosure 10 and some energy will be lost at the openings 14, 16, 22 and 24. However, in a practical application, these openings take up less than 5 percent of the total sphere area. As a result, the bulk of the radiation losses occur by absorption at the reflecting walls and not by escape through the openings. We have derived an expression for the effective path length of a sphere constructed in accordance with the invention which may be approximately expressed as:

$$T = \frac{2d}{\pi}(a+z)$$

where $T$ = effective path length
$d$ = the diameter of the sphere
$a$ = absorptivity of the inner walls of the sphere, and
$z$ = ratio of the total area of the four openings to the total area of the sphere.

While we have described our invention with regard to preferred embodiment thereof, modifications and variations thereto will now be apparent to those skilled in the art. For a definition of the invention, reference is made to the appended claims.

We claim:

1. Apparatus for detecting the presence of a gas in the atmosphere by the absorption by the gas of infrared radiation, said apparatus comprising means providing modulated infrared radiation, detector means responsive to said radiation, an absorption chamber into which the atmosphere is introduced and through which the radiation passes to said detector means, said chamber having a highly reflective specular internal surface providing random reflections of said radiation.

2. Apparatus for detecting the presence of a gas in the atmosphere by the absorption by the gas of infrared radiation, said apparatus comprising means providing modulated infrared radiation, detector means responsive to said radiation, an absorption chamber into which the atmosphere is introduced and through which the radiation passes to said detector, said chamber being generally spherical in shape and having an internal surface which is specular and highly reflective to provide random reflections of the infrared radiation between emission and detection thereof.

3. Apparatus for detecting the presence of a substance in the atmosphere by absorption by the substance of energy radiated in a predetermined spectrum, said apparatus comprising a source of radiation, detector means responsive to said radiation, an absorption chamber into which the atmosphere is introduced and through which the radiation from said source travels to said detector means, means for modulating the radiation from said source, said chamber having a highly reflective specular internal surface whereby the radiation from said source is reflected in a random fashion within said chamber.

4. Apparatus for detecting the presence of a substance in the atmosphere by absorption by the substance of energy radiation in a predetermined spectrum, said apparatus comprising a source of radiation, detector means responsive to said radiation, an absorption chamber into which the atmosphere is introduced and through which the radiation travels to said detector means, means for modulating the radiation from said source, said chamber being generally spherical in shape with a plurality of indentations formed therein to distort the generally spherical shape thereof, the internal surface of said chamber being highly reflective and specular whereby radiation from said source is reflected within said chamber in a random fashion.

5. A point gas detecting device comprising a generally spherical enclosure having a plurality of indentations formed in the surface thereof for distorting the internal surface of said enclosure, said internal surface being specular and coated with a highly reflective material, said enclosure having a plurality of apertures therein, two of said apertures being utilized for introducing and exhausting a gas containing atmosphere, a source of infrared radiation positioned adjacent a third aperture, a detector sensitive to said radiation positioned adjacent a fourth aperture, means positioned between said source and said third aperture for modulating the infrared radiation.

6. A point gas detecting device comprising a generally spherical enclosure having a plurality of indentations formed in the surface thereof for distorting the internal surface of said enclosure, said enclosure having a plurality of apertures formed therein, two of said apertures being utilized for introducing and exhausting a gas containing atmosphere, a source of infrared radiation positioned adjacent a third aperture, a detector sensitive to said radiation and positioned adjacent a fourth aperture, means positioned between said source and said third aperture for modulating the infrared radiation, the internal surface of said enclosure being specular and coated with a highly reflective material whereby the radiation from said infrared source is reflected within said enclosure in a random fashion.

7. A point gas detecting device in accordance with claim 6 wherein said means for modulating the infrared radiation comprises a chopper disc including an analytic filter which passes radiation of a wave length which is readily absorbed by the gas to be detected and a reference filter which passes radiation of a wave length which is not readily absorbed by the gas to be detected.

8. A point gas detecting device in accordance with claim 7 wherein said highly reflective material is gold.

9. A portable gas detector comprising a spherical absorption chamber having first, second, third and fourth openings therein, two of said openings being provided for introducing and exhausting a gas containing atmosphere, a source of infrared radiation adapted to radiate energy through said third opening, detector means sensitive to said radiation and positioned to receive radiation passing through said fourth opening, means positioned between said source and said third opening for modulating the infrared radiation, said chamber having a highly reflective internal surface, a plurality of dimples formed in the surface of said chamber providing a plurality of specular reflectors whereby the energy radiated from said source is reflected within said chamber in a random fashion.

10. An absorption chamber for a gas detector of the type that operates on the principle of radiation absorption, said chamber being of generally spherical shape having a highly reflective internal surface with a plurality of indentations therein forming specular reflectors, said chamber including a pair of openings therein for introducing and exhausting a gas containing atmosphere and a second pair of openings for passing energy radiation therethrough.

References Cited by the Examiner

UNITED STATES PATENTS

| | | | |
|---|---|---|---|
| 2,212,211 | 8/1940 | Pfund | 250—43.5 |
| 3,193,677 | 7/1965 | McHenry | 250—43.5 |

RALPH G. NILSON, *Primary Examiner.*

A. L. BIRCH, *Assistant Examiner.*